(12) United States Patent
Potucek et al.

(10) Patent No.: US 11,256,274 B2
(45) Date of Patent: Feb. 22, 2022

(54) PROGRAMMABLE TEMPERATURE CONTROL SYSTEM FOR POOLS AND SPAS

(71) Applicant: Hayward Industries, Inc., Berkeley Heights, NJ (US)

(72) Inventors: Kevin L. Potucek, Naples, FL (US); Gilbert Conover, Providence, RI (US); James Murdock, Wakefield, RI (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 663 days.

(21) Appl. No.: 15/359,112

(22) Filed: Nov. 22, 2016

(65) Prior Publication Data

US 2017/0285672 A1 Oct. 5, 2017
US 2020/0150701 A9 May 14, 2020

Related U.S. Application Data

(62) Division of application No. 11/704,718, filed on Feb. 9, 2007, now Pat. No. 9,501,072.
(Continued)

(51) Int. Cl.
*G05D 23/19* (2006.01)
*E04H 4/12* (2006.01)

(52) U.S. Cl.
CPC ......... *G05D 23/1931* (2013.01); *E04H 4/129* (2013.01); *G05D 23/1902* (2013.01); *G05D 23/1923* (2013.01)

(58) Field of Classification Search
CPC ............... G05B 19/10; G05D 23/1931; G05D 23/1923; G05D 23/1902; E04H 4/129
See application file for complete search history.

(56) References Cited

U.S. PATENT DOCUMENTS 2,498,818 A 2/1950 Nogle
2,509,031 A 5/1950 Bockmeyer
(Continued)

FOREIGN PATENT DOCUMENTS

WO 2007/092619 A2 8/2007
WO 2007/095087 A2 8/2007

OTHER PUBLICATIONS

International Search Report and Written Opinion of the International Searching Authority dated Sep. 12, 2007, issued in connection with International Patent Appl. No. PCT/US07/03572 (6 pages).
(Continued)

*Primary Examiner* — Tejal Gami
(74) *Attorney, Agent, or Firm* — McCarter & English, LLP

(57) ABSTRACT

A system and method are provided for controlling water temperature in a body of water. The temperature control system includes a processor, a user interface for receiving a desired temperature and a desired time for reaching the desired temperature, a sensor interface for receiving sensor information from one or more sensors, and an actuator interface for controlling a plurality of heat sources. The processor determines one or more optimal heat sources for heating the body of water to the desired temperature by the desired time. The processor controls the one or more optimal heat sources through the actuator interface and periodically polls the sensor interface to determine whether changes in the operating environment require additional or alternate heat sources to be activated to ensure that the body of water is heated to the desired temperature by the desired time.

30 Claims, 10 Drawing Sheets

Related U.S. Application Data

(60) Provisional application No. 60/771,762, filed on Feb. 9, 2006, provisional application No. 60/771,656, filed on Feb. 9, 2006.

(56) References Cited

U.S. PATENT DOCUMENTS

| | | |
|---|---|---|
| 3,086,715 A | 4/1963 | Mineau et al. |
| 3,320,160 A | 5/1967 | Welles, Jr. et al. |
| 3,416,729 A | 12/1968 | Ravitts et al. |
| 3,497,185 A | 2/1970 | Dively |
| 3,515,375 A | 6/1970 | Roos |
| 3,524,629 A | 8/1970 | Culwell |
| 3,528,548 A | 9/1970 | Sheckler |
| 3,572,658 A | 3/1971 | Ravitts |
| 3,735,926 A | 5/1973 | Ravitts |
| 3,739,986 A | 6/1973 | Ravitts |
| 3,771,724 A | 11/1973 | Rose et al. |
| 3,781,925 A | 1/1974 | Curtis et al. |
| 3,809,116 A | 5/1974 | Sanner |
| 3,823,767 A | 7/1974 | McLaughlin |
| 3,837,016 A | 9/1974 | Schindler et al. |
| 3,926,008 A | 12/1975 | Webber |
| 3,953,551 A | 4/1976 | Dorall |
| 3,970,069 A | 7/1976 | Pickett |
| 4,153,955 A | 5/1979 | Hinterberger |
| 4,189,791 A | 2/1980 | Dundas |
| 4,226,815 A | 10/1980 | Cockman |
| 4,233,694 A | 11/1980 | Janosko et al. |
| 4,322,297 A | 3/1982 | Bajka |
| 4,350,589 A | 9/1982 | Stog |
| 4,368,549 A | 1/1983 | Ramey |
| 4,381,031 A | 4/1983 | Whitaker et al. |
| 4,385,724 A | 5/1983 | Ramsauer et al. |
| 4,393,527 A | 7/1983 | Ramey |
| 4,404,697 A | 9/1983 | Hatcher |
| 4,409,694 A | 10/1983 | Barrett, Sr. et al. |
| 4,424,438 A | 1/1984 | Antelman et al. |
| 4,467,183 A | 8/1984 | Ishima |
| 4,541,413 A | 9/1985 | Cannaux et al. |
| 4,563,780 A | 1/1986 | Pollack |
| 4,564,141 A | 1/1986 | Montgomery et al. |
| 4,593,177 A | 6/1986 | Trostler |
| 4,621,613 A | 11/1986 | Krumhansl |
| 4,780,917 A | 11/1988 | Hancock |
| 4,930,229 A | 6/1990 | Moser |
| 4,936,506 A | 6/1990 | Ryan |
| 5,184,472 A | 2/1993 | Guilbault et al. |
| 5,278,455 A | 1/1994 | Hamos |
| 5,361,215 A | 11/1994 | Tompkins et al. |
| 5,415,221 A | 5/1995 | Lakryk |
| 5,526,538 A | 6/1996 | Rainwater |
| 5,550,753 A | 8/1996 | Tompkins et al. |
| 5,559,720 A | 9/1996 | Tompkins et al. |
| 5,560,210 A | 10/1996 | Bronicki |
| 5,585,025 A | 12/1996 | Idland |
| 5,616,239 A | 4/1997 | Wendell et al. |
| 5,730,861 A | 3/1998 | Sterghos et al. |
| 5,787,519 A | 8/1998 | Smith |
| 5,809,796 A | 9/1998 | Zakryk |
| 5,889,684 A | 3/1999 | Ben-David et al. |
| 5,932,127 A | 8/1999 | Maddox |
| 5,988,516 A | 11/1999 | Gilmour |
| 5,996,977 A | 12/1999 | Burgess |
| 6,003,164 A | 12/1999 | Leaders |
| 6,044,901 A | 4/2000 | Basala |
| 6,081,944 A | 7/2000 | Edwards |
| 6,084,218 A | 7/2000 | McDonough |
| 6,109,050 A | 8/2000 | Lakryk |
| 6,125,481 A | 10/2000 | Sicilano |
| 6,145,139 A | 11/2000 | Bonn |
| 6,190,544 B1 | 2/2001 | Edwards |
| 6,253,121 B1 | 6/2001 | Cline et al. |
| 6,253,227 B1 | 6/2001 | Tompkins et al. |
| 6,282,370 B1 | 8/2001 | Cline et al. |
| 6,354,573 B1 | 3/2002 | Morando |
| 6,407,469 B1 | 6/2002 | Cline et al. |
| 6,444,129 B1 | 9/2002 | Collins |
| 6,488,408 B1 | 12/2002 | Laflamme et al. |
| 6,590,188 B2 | 7/2003 | Cline et al. |
| 6,627,858 B2 | 9/2003 | Nomura et al. |
| 6,629,021 B2 | 9/2003 | Cline et al. |
| 6,643,108 B2 | 11/2003 | Cline et al. |
| 6,670,584 B1 | 12/2003 | Azizeh |
| 6,747,367 B2 | 6/2004 | Cline et al. |
| 6,782,309 B2 | 8/2004 | Laflamme et al. |
| 6,943,325 B2 | 9/2005 | Pittman et al. |
| 6,965,815 B1 | 11/2005 | Tompkins et al. |
| 6,976,052 B2 | 12/2005 | Tompkins et al. |
| 7,030,343 B2 | 4/2006 | Tran |
| 7,057,140 B2 | 6/2006 | Pittman |
| 7,132,954 B2 | 11/2006 | Shebek et al. |
| 7,158,909 B2 | 1/2007 | Tarpo et al. |
| 7,167,087 B2 | 1/2007 | Corrington et al. |
| 7,236,692 B2 | 6/2007 | Tran |
| 7,292,898 B2 | 11/2007 | Clark et al. |
| 7,397,360 B2 | 7/2008 | Corrington et al. |
| 7,417,834 B2 | 8/2008 | Cline et al. |
| 7,440,864 B2 | 10/2008 | Otto |
| 9,501,072 B2 | 11/2016 | Potucek et al. |
| 2001/0029407 A1 | 10/2001 | Tompkins et al. |
| 2001/0047539 A1 | 12/2001 | Lynn |
| 2003/0034284 A1 | 2/2003 | Wolfe |
| 2003/0150394 A1 | 8/2003 | Wolfe |
| 2003/0168516 A1 | 9/2003 | Cline |
| 2004/0117330 A1 | 6/2004 | Ehlers et al. |
| 2004/0261167 A1 | 12/2004 | Panopoulos |
| 2005/0063123 A1 | 3/2005 | Cline et al. |
| 2005/0066433 A1 | 3/2005 | Phillips |
| 2005/0066434 A1 | 3/2005 | Phillips |
| 2005/0072850 A1 | 4/2005 | Cornwall et al. |
| 2006/0059922 A1 | 3/2006 | Anderson et al. |
| 2006/0238931 A1 | 10/2006 | Cline et al. |
| 2007/0093920 A1 | 4/2007 | Tarpo et al. |
| 2007/0094784 A1 | 5/2007 | Tran |
| 2007/0139194 A1 | 6/2007 | Corrington et al. |
| 2007/0233420 A1 | 10/2007 | Potucek et al. |
| 2007/0233509 A1 | 10/2007 | Buchman et al. |
| 2008/0039977 A1 | 2/2008 | Clark et al. |
| 2008/0041839 A1 | 2/2008 | Tran |
| 2015/0040307 A1 | 2/2015 | Deloche et al. |

OTHER PUBLICATIONS

Supplementary European Search Report and Search Opinion dated Jul. 5, 2012, issued in connection with European Patent Appl. No. 07763570.4 (7 pages).

Restriction Requirement dated Mar. 31, 2008, issued in connection with U.S. Appl. No. 11/704,717 (6 pages).

Office Action dated Jan. 21, 2009, issued in connection with U.S. Appl. No. 11/704,717 (8 pages).

Office Action dated Nov. 24, 2009, issued in connection with U.S. Appl. No. 11/704,717 (9 pages).

Office Action dated Aug. 4, 2010, issued in connection with U.S. Appl. No. 11/704,717 (9 pages).

Office Action dated Mar. 1, 2011, issued in connection with U.S. Appl. No. 11/704,717 (10 pages).

Office Action dated Nov. 4, 2011, issued in connection with U.S. Appl. No. 11/704,717 (15 pages).

International Search Report and Written Opinion of the International Searching Authority dated Jul. 30, 2008, issued in connection with International Patent Appl. No. PCT/US07/03472 (11 pages).

Invitation to Pay Additional Fees dated Jun. 15, 2009, issued in connection with International Patent Appl. No. PCT/US07/03472 (2 pages).

International Search Report dated Jun. 15, 2009, issued in connection with International Patent Appl. No. PCT/US07/03472 (5 pages).

Written Opinion of the International Searching Authority dated Jun. 15, 2009, issued in connection with International Patent Appl. No. PCT/US07/03472 (8 pages).

(56) References Cited

OTHER PUBLICATIONS

Supplementary European Search Report and Search Opinion dated Jun. 25, 2013, issued in connection with European Patent Appl. No. 07750318.3 (9 pages).
Restriction Requirement dated Dec. 22, 2008, issued in connection with U.S. Appl. No. 11/704,718 (9 pages).
Office Action dated Apr. 30, 2009, issued in connection with U.S. Appl. No. 11/704,718 (20 pages).
Office Action dated Dec. 4, 2009, issued in connection with U.S. Appl. No. 11/704,718 (20 pages).
Office Action dated Apr. 17, 2012, issued in connection with U.S. Appl. No. 11/704,718 (22 pages).
Office Action dated Nov. 13, 2012, issued in connection with U.S. Appl. No. 11/704,718 (21 pages).
Examiner's Answer dated May 30, 2014, issued in connection with U.S. Appl. No. 11/704,718 (27 pages).
Decision on Appeal mailed Jun. 21, 2016, issued in connection with U.S. Appl. No. 11/704,718 (6 pages).
Notice of Allowance dated Jul. 13, 2016, issued in connection with U.S. Appl. No. 11/704,718 (5 pages).
Jandy, AquaLink RS—OneTouch Control Systems, Owner's Manual, Rev. G, Wayback Machine archive dated Feb. 3, 2005 (https://web.archive.org/web/20050203232336/http://jandy.com/pdfs/OneTouch_Manual.pdf) (coversheet and 39 pages).

PROGRAMMABLE TEMPERATURE CONTROL SYSTEM FOR POOLS AND SPAS

RELATED APPLICATIONS

This application is a divisional application of and claims the benefit of priority to U.S. patent application Ser. No. 11/704,718 filed on Feb. 9, 2007 and claims the benefit of priority to U.S. Provisional Application Ser. No. 60/771,656 filed on Feb. 9, 2006, and U.S. Provisional Application Ser. No. 60/771,762 filed on Feb. 9, 2006, the entire disclosures of which are expressly incorporated herein by reference in their entirety.

BACKGROUND OF THE INVENTION

Field of the Invention

The present invention relates to temperature control systems, and more particularly, to a programmable temperature control system for pools and spas.

Background of the Invention

Various temperature controllers have, in the past, been developed for pools and spas. One example is a simple thermostat for controlling the temperature of water in a pool or spa. In such a system, a heater is activated when the water temperature is below a desired value, thereby heating the water. When the water temperature reaches the desired temperature, the heater is deactivated. The heater is then re-activated when the water temperature falls below a pre-determined threshold. This cycle is continuously repeated so as to maintain the desired water temperature in the pool or spa.

Heaters for pools and spas can be powered by numerous energy sources, such as gas, oil, or electricity. Some systems employ solar power. Still others combine solar power with conventional oil, gas, or electric heat sources. One such system known in the art is disclosed in U.S. Pat. No. 4,368,549 to Ramay (hereinafter "the Ramay '549 patent"). The Ramay '549 patent discloses a swimming pool heating system which uses a solar collector as a primary heating source, supplemented by a heater powered by oil, gas, or electricity. The temperature control system disclosed in the Ramay '549 patent automatically adjusts the temperature settings of the supplemental heater to conform to the temperature versus time profile of an optimum solar collector heating system.

Microprocessor-based swimming pool management systems are known in the art. One example of such a system is disclosed in U.S. Pat. No. 6,125,481 to Sicilano (hereinafter, the "Sicilano '481 patent"). The Sicilano '481 patent discloses a swimming pool management system that automatically dispenses substances into a pool. Other systems allow a user to specify a desired temperature and a desired time at which the temperature is to be provided, and control a heater so that the temperature is provided at the desired time.

Despite efforts to date, improved temperature control systems for pools and spas are needed that offer greater control of efficiency when heating pools and spas, and/or flexibility in heating pools and spas. These and other needs are addressed in the systems and methods disclosed herein.

SUMMARY OF THE INVENTION

The present invention overcomes the disadvantages and shortcomings of the prior art by providing a programmable temperature control system for pools or spas which allows a user to specify both a desired water temperature and a desired time at which the temperature is to be achieved, and which automatically selects one or more optimum heating sources from a plurality of heating sources. The programmable temperature control system includes a microprocessor-based controller connected to a plurality of heater actuators, a plurality of valve actuators, and a plurality of sensors. The plurality of sensors includes a water temperature sensor, an ambient temperature sensor, an ambient humidity sensor, an ambient light sensor, and, optionally, a depth level sensor and a flow rate sensor. The heater actuators are connected to a plurality of heaters, which could include gas, electric, solar, or other types of heaters. The controller includes a user interface (e.g., a keyboard and display) for allowing a user to interact with a stored control program for controlling the water temperature of a pool or spa. The stored control program allows the user to operate in a manual mode or a program mode. In manual mode, the user can specify a desired water temperature and a desired heat source, and the system heats the water to the desired temperature. Then, the system operates in a thermostat mode, wherein the water temperature is monitored and the heater is controlled to maintain the water temperature at the desired temperature.

In program mode, the user can activate one or more stored temperature control programs. The stored temperature control program allows the user to specify a desired water temperature and desired time at which the temperature is to be achieved. The stored temperature control program identifies the types of heaters present in the system, and their respective power outputs. Based on measured water temperatures, ambient conditions, the power outputs of the heaters, and, optionally, water flow rates, the stored temperature control program activates an optimum heater from the plurality of heaters so that the desired water temperature is provided at the desired time. The system can automatically switch to another heater so as to achieve optimum efficiency, or operate two or more heaters at the same time. For example, the stored temperature control program can periodically poll the ambient light sensor and ambient temperature sensor to determine whether the sun is shining brightly and whether the ambient temperature is above a predetermined threshold. In such a circumstance, the controller could activate a solar heater to heat the pool water, thereby increasing efficiency. Any desired types of stored temperature control programs could be provided in the controller.

Further features and advantages of the present invention will appear more clearly upon a reading of the following detailed description of exemplary embodiment(s) of the invention.

BRIEF DESCRIPTION OF THE DRAWINGS

For a more complete understanding of the present invention, reference is made to the following detailed description of exemplary embodiment(s) considered in conjunction with the accompanying drawings, in which.

DETAILED DESCRIPTION OF THE INVENTION

Figure 1:
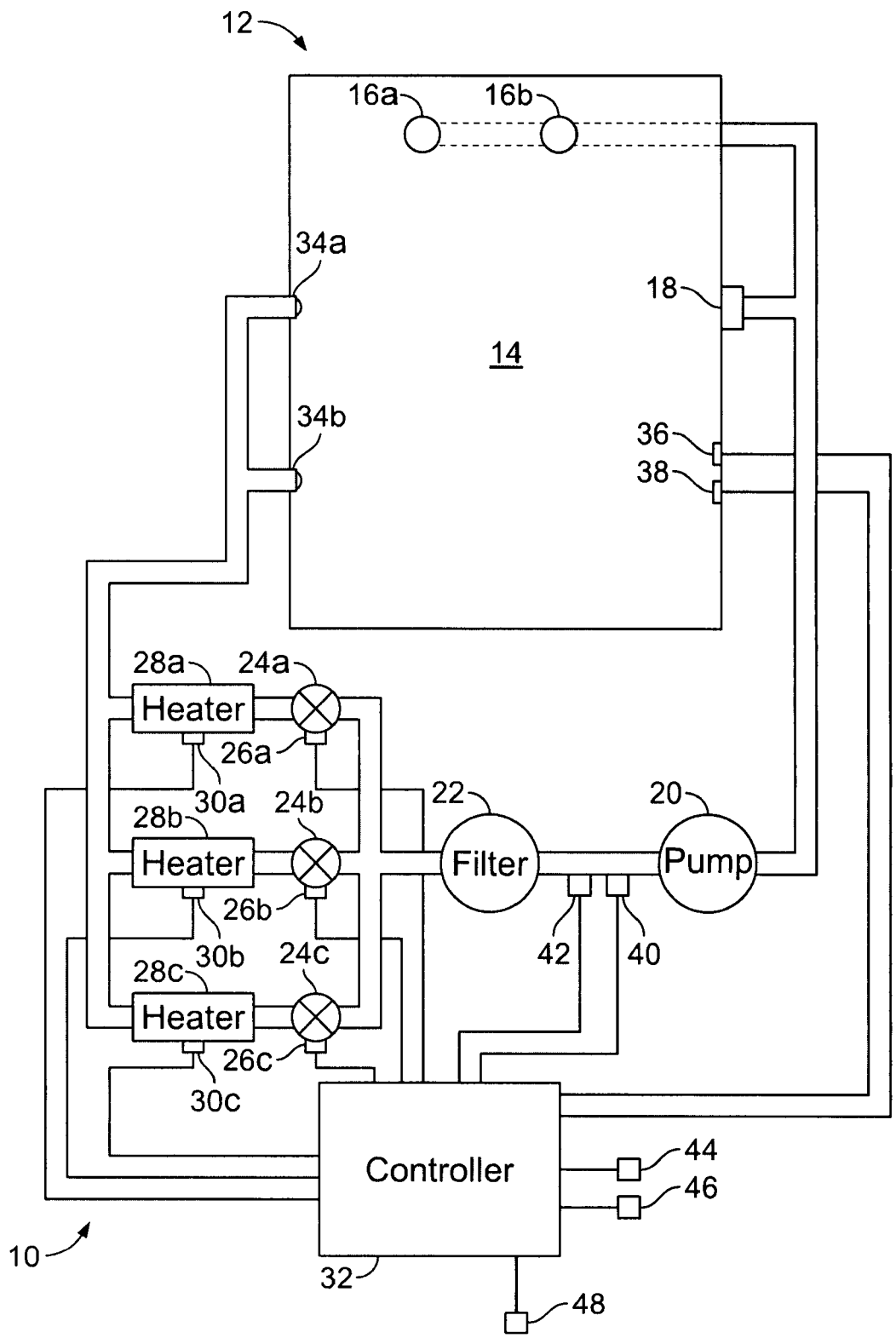
FIG. 1 is a block diagram of a programmable temperature control system for a pool and/or spa constructed in accordance with an exemplary embodiment of the present invention.

FIG. 1 is a block diagram showing the programmable temperature control system of the present invention, indicated generally at 10. The control system 10 is operable with any pool or spa. As shown in FIG. 1, the control system 10 is operable to control the temperature of water 14 in a pool 12. The pool 12 can be constructed in accordance with any desired design, and could have any desired shape. Thus, for example, the pool 12 could include dual main drains 16a, 16b, a skimmer 18, a pump 20, a filter 22, a plurality of heaters 28a-28c, and return jets 34a, 34b. The control system 10 includes a plurality of valve actuators 26a-26c for selectively controlling valves 24a-24c, a plurality of heater actuators 30a-30c, a controller 32, a water temperature sensor 36, a depth level sensor 38, an inline temperature sensor 40, a flow rate sensor 42, an ambient temperature sensor 44, an ambient humidity sensor 46, and an ambient light sensor 48. Of course, the numbers and types of the sensors 36-48 could be varied without departing from the spirit or scope of the present invention. It should be noted that the depth level sensor 38 and the flow rate sensor 42 are optional components. Further, it should be noted that the inline temperature sensor 40 could be placed downstream of the filter 22.

In the embodiment shown in FIG. 1, the heaters 28a-28c and the valves 24a-24c are connected in a parallel configuration, but any other desired combination (i.e., serial configuration) could be provided. The heaters 28a-28c can be powered by any suitable energy source, such as electricity, gas, oil, or solar power. The controller 32 selectively actuates the valves 24a-24c (using the valve actuators 26a-26c), as well as the heater actuators 30a-30c, based upon ambient and water conditions so that an optimal one of the heaters 28a-28c is operated to heat the water 14 of the pool 12. The valve actuators 26a-26c could be any commercially-available actuator known in the art, such as a solenoid- or motor-driven valve actuator.

The aforementioned ambient and water conditions are monitored by the controller 32 using the sensors 36-48. The depth level sensor 36 measures the depth of the water 14 in the pool 12 so that the controller 32 can approximate the total volume of water 14 in the pool 12. The water temperature sensor 38 measures the temperature of the water 14 of the pool 12 as a whole. Optionally, the inline temperature sensor 40 can also measure the temperature of the water 14, and could be positioned between the pump 20 and the filter 22 as an alternative to the water temperature sensor 38, or in addition thereto. The sensor 42 measures the flow rate of the water 14 between the pump 20 and the filter 22. The ambient temperature sensor 44 measures the temperature of the air outside of the pool 12. The ambient humidity sensor 46 measures the humidity of the air outside of the pool 12. The ambient light sensor 48, which could be a CdS photocell or any other suitable light sensor, detects the presence and intensity of sunlight, which is used by the controller 32 to determine the heating capacity of a solar heater in the event that such a heater is provided as one of the heaters 28a-28c. Further, the ambient light sensor 48 could be a "black body" sensor, wherein a standard temperature sensor is positioned within a black housing. It has been found that such an arrangement provides increased sensitivity to heat generated by sunlight. The heater actuators 30a-30c include circuitry for actuating the heaters 28a-28c, and can also include temperature sensors for measuring the temperature of heated water exiting from the heaters 28a-28c.

In operation, the water 14 is pumped by the pump 20 from the pool 12 via the main drains 16a, 16b and the skimmer 18. The water 14 passes through the filter 22, which could be any suitable commercial or residential pool filter known in the art, to the valves 24a-24c. The controller 32 operates one of the valves 24a-24c via a corresponding one of the valve actuators 26a-26c, and activates one or more of the heaters 28a-28c using one of the heater actuators 30a-30c for heating the pool water 14. It should be noted that two or more of the heaters 28a-28c could be activated simultaneously, if desired. The choice of heaters 28a-28c is based on measurements obtained from the sensors 36-48, as well as thermostats in the heater actuators 30a-30c, if provided. The heated water 14 flows through return lines to output jets 34a, 34b, which return the heated water to the pool 12.

Figure 2:
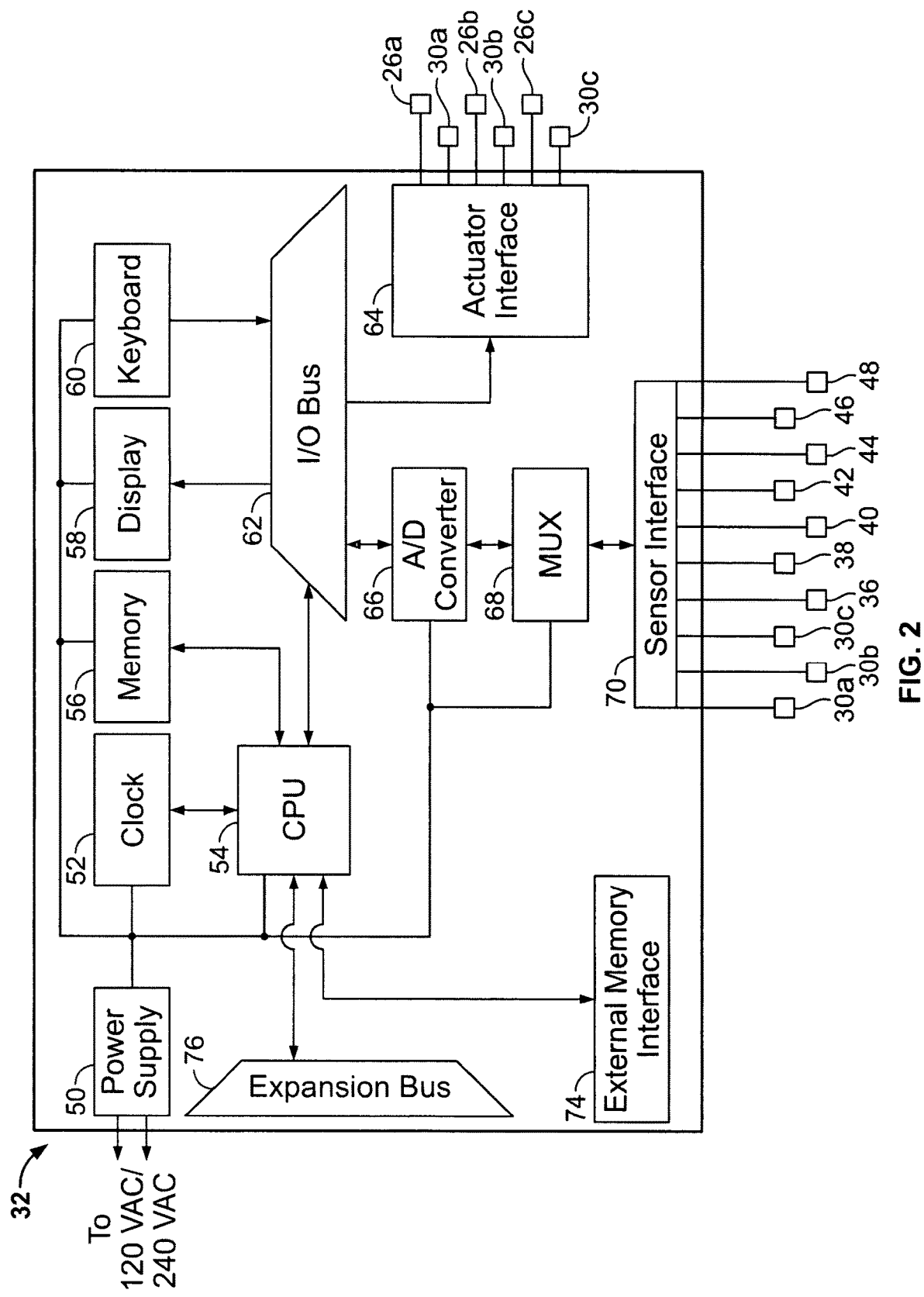
FIG. 2 is a block diagram showing the controller of FIG. 1 in greater detail.

FIG. 2 is a block diagram showing the components of the controller 32 of FIG. 1 in greater detail. The components of the controller 32 include a power supply 50, a clock 52, a processor or central processing unit (CPU) 54, memory 56, a display 58, a keyboard 60, input/output (I/O) bus circuitry 62, an actuator interface 64, an analog-to-digital (A/D) converter 66, a multiplexer (MUX) 68, a sensor interface 70, an external memory interface 74, and an expansion bus 76. The power supply 50 can include one or more AC-to-DC converters for supplying various voltage levels to the components of the controller 32. The power supply 50 can also include a ground fault circuit interrupter (GFCI) to protect against ground faults. The clock 52 can be a battery-backed, real time clock or a zero-crossing detector which derives clock pulses from the AC power line.

Processor 54 can reside within an embedded system having an external standard bus system. The bus system, such as STD, VME, or any other bus type, can accept several types of expansion cards via the expansion bus 76. The processor 54 could be the PIC 18F2620 microprocessor manufactured by Microchip, Inc. The processor 54 could be programmed in any suitable high or low level language (e.g., assembler language), and it could also run any suitable operating system. The memory 56 can include random access memory, read-only memory, hard disk, FLASH memory, or any other suitable memory circuit. Non-volatile memory for the system could also be provided in the memory 56, and could be expanded as desired using the external memory interface 74. The memory 56 (or external memory plugged into the external memory interface 74) stores the control logic executed by the present invention, as well as data gathered from the sensors 36-48 and control signals for actuators 26a-26c and the heater interfaces 30a-30c (and, optionally, temperature readings provided by each of the heater interfaces 30*a*-30*c*). The control logic of the present invention could be written in any suitable high or low level programming language, and stored as executable object code in the memory 56.

Figure 3:
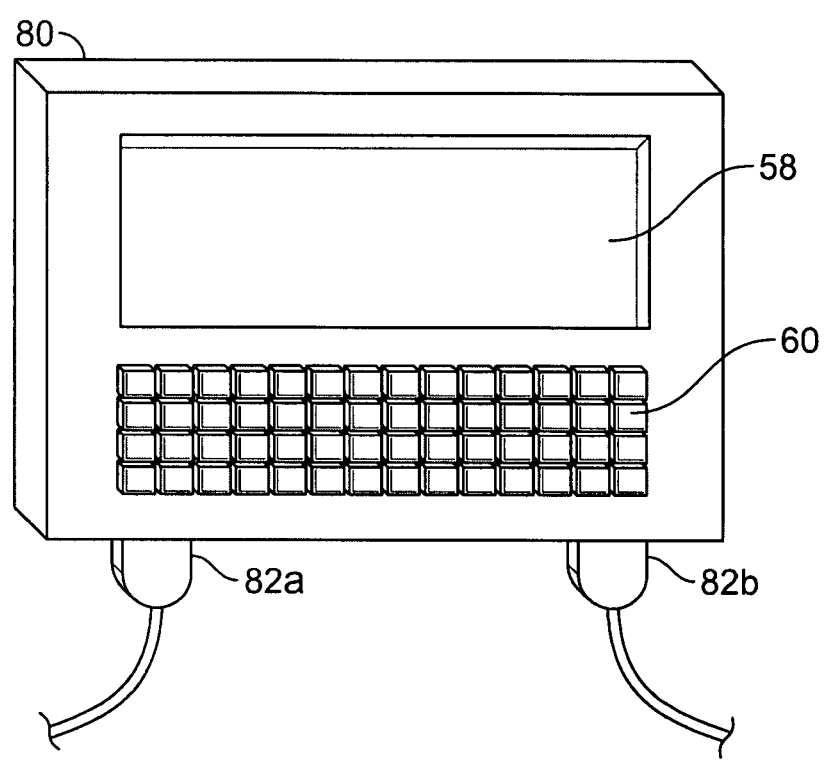
FIG. 3 is a perspective view of a control panel having a display and keyboard for allowing a user to interact with the controller of the present invention.

Referring now to FIGS. 2 and 3, the display 58 and the keyboard 60 can be provided in a housing 80. The keyboard 60 can include push buttons or a flat panel membrane for allowing a user to interact with the controller 32 of the present invention. The keyboard 60 acts as an array of on/off switches, which the processor 54 receives as interrupts. These quantities can be displayed on the display 58, which can be a vacuum-fluorescent tube, an electroluminescent display, LCD display, etc. Optionally, the keyboard 60 and display 58 could be replaced with a single touch-sensitive display. Electrical wiring interfaces 82*a*, 82*b* connect the keyboard 60 and the display 58 to the controller 32. The keyboard 60 and the display 58 can reside in the vicinity of the pool 12, or at a remote location, such as within a dwelling.

Referring again to FIG. 2, the processor 54 includes a number of general purpose, digital I/O control lines which can drive outputs or receive inputs from other devices via the I/O bus circuitry 62. The I/O bus circuitry 62 could also provide a path to the processor 54 for receiving data and interrupts from a GFCI within the power supply 50 when a ground fault is detected, as well as data from the clock 52 and data entered at the keyboard 60. The processor 54 utilizes the I/O bus circuitry 62 to drive the display 58. The processor 54 can receive measurements from the heater actuators 30*a*-30*c* and the sensors 36-48 via the sensor interface 70, the analog-to-digital (A/D) converter 66, and the multiplexer 68. Additionally, the processor 54 can control one or more of the valve actuators 26*a*-26*c* (e.g., to operate one or more of the valves 24*a*-24*c* of FIG. 1) and one or more of the heater actuators 30*a*-30*c* (e.g., to activate one or more of the heaters 28*a*-28*c* of FIG. 1) using the actuator interface 64 and the I/O bus circuitry 62. The controller 32 can be electrically isolated from the valves 24*a*-24*c* and the rest of the pool 12 via isolation circuitry within the actuator interface 64, which may be implemented, for example, using opto-isolators, solenoids, transformers, etc.

Figure 4:
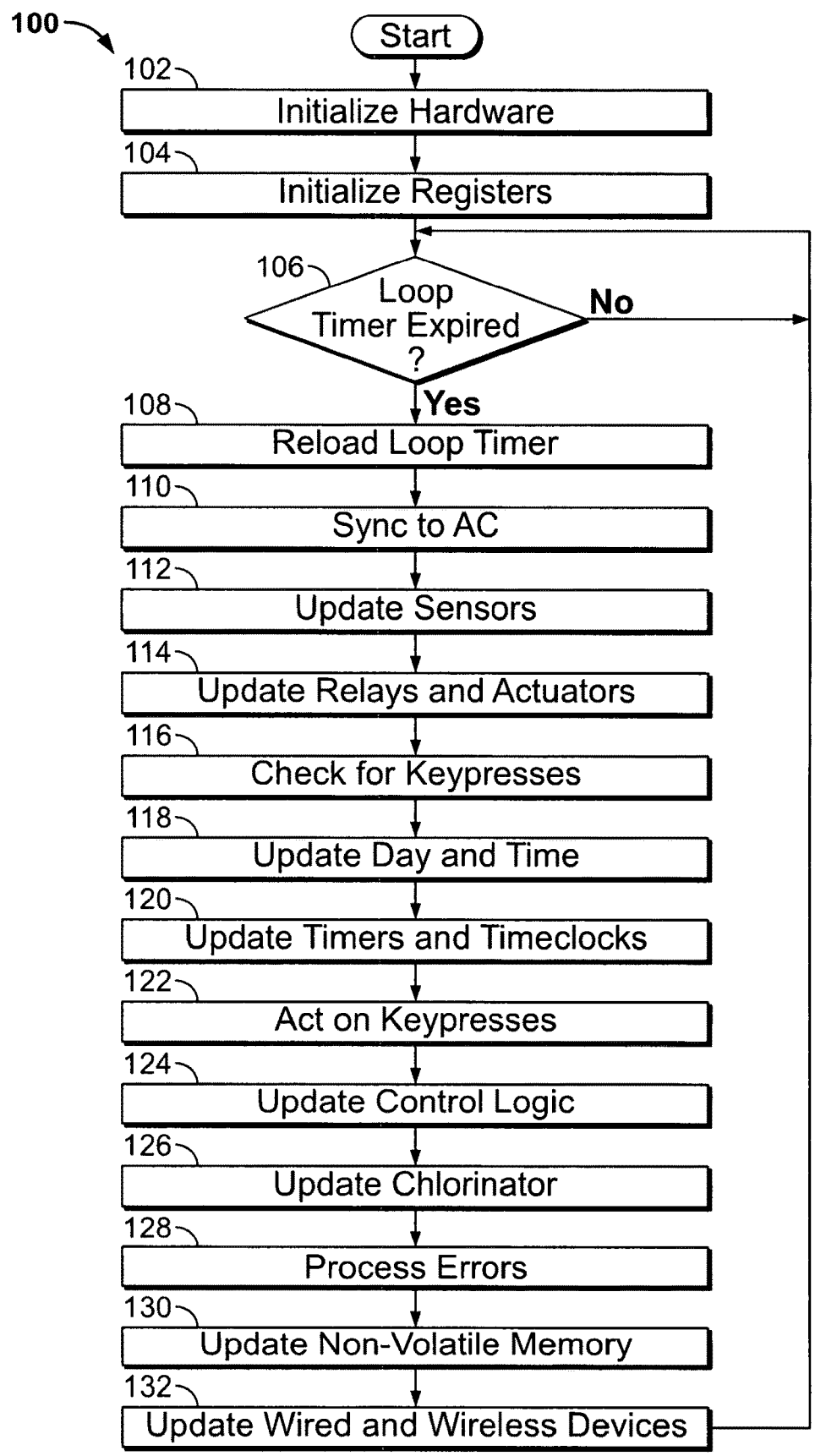
FIG. 4 is a flow chart showing processing steps of the main control program executed by the controller of FIG. 2.

With reference to FIG. 4, a flow chart is shown illustrating the main control program 100 of the present invention, which is executed by the processor 54 of FIG. 2 upon application of power to the controller 32. System hardware is initialized at step 102. Then, in step 104, the registers of the controller are initialized for use. This could be accomplished by setting all of the registers of the controller 32 to pre-defined values. At this time, a loop timer is also initialized for controlling overall program flow. In step 106, a determination is made as to whether the loop timer has expired. If a negative decision is made, step 106 is re-invoked. If a positive determination is made (i.e., the loop timer has expired), step 108 is invoked, wherein the loop timer is re-loaded. In step 110, the circuitry of the controller is synchronized to the frequency of the alternating current (AC) power supply connected to the controller. Among other functions, this allows the controller 32 to synchronously read the sensors and update the relays, actuators, and other devices connected to the controller 32.

In step 112, the controller updates all sensors connected to the controller 32. Optionally, in this step, the controller 32 can poll each sensor to determine the types of sensors connected to the sensor interface 70, as well as the operational status of each sensor (e.g., operational, failure mode, etc.). In step 114, the controller 32 updates all relays and actuators connected thereto. In step 116, the controller 32 checks for user input (such as user input or "keypresses" using the keyboard 60 of FIG. 2). In step 118, the controller's memory is updated with the current day and time information stored in the controller's clock (e.g., a real-time clock). In step 120, all timers and clocks ("timeclocks") utilized by the controller are then updated.

In step 122, the controller 32 acts on commands or information entered by a user. For example, in this step, the user can enter or change date and time information. In step 124, the controller 32 executes a specialized control program loaded into the memory of the controller 32, such as the stored temperature control program of the present invention which will be discussed hereinbelow. Optionally, in step 126, if an automated pool chlorinator is connected to the controller 32, it is updated for operation and control by the controller 32. In step 128, any errors detected by the controller 32 are processed, including, but not limited to, malfunctioning sensors or actuators connected to the controller 32. In response to such errors, the controller 32 can disable a malfunctioning sensor or actuator, display an error code, or undertake any other preprogrammed action. In step 130, non-volatile memory of the controller is updated, if applicable. Finally, in step 132, any wired or wireless devices in communication with the controller 32, including but not limited to, handheld controllers, remote control panels connected to the controller 32 (such as inside of a dwelling), or other devices, are updated for use and control. Processing then returns to step 106.

Figure 5:
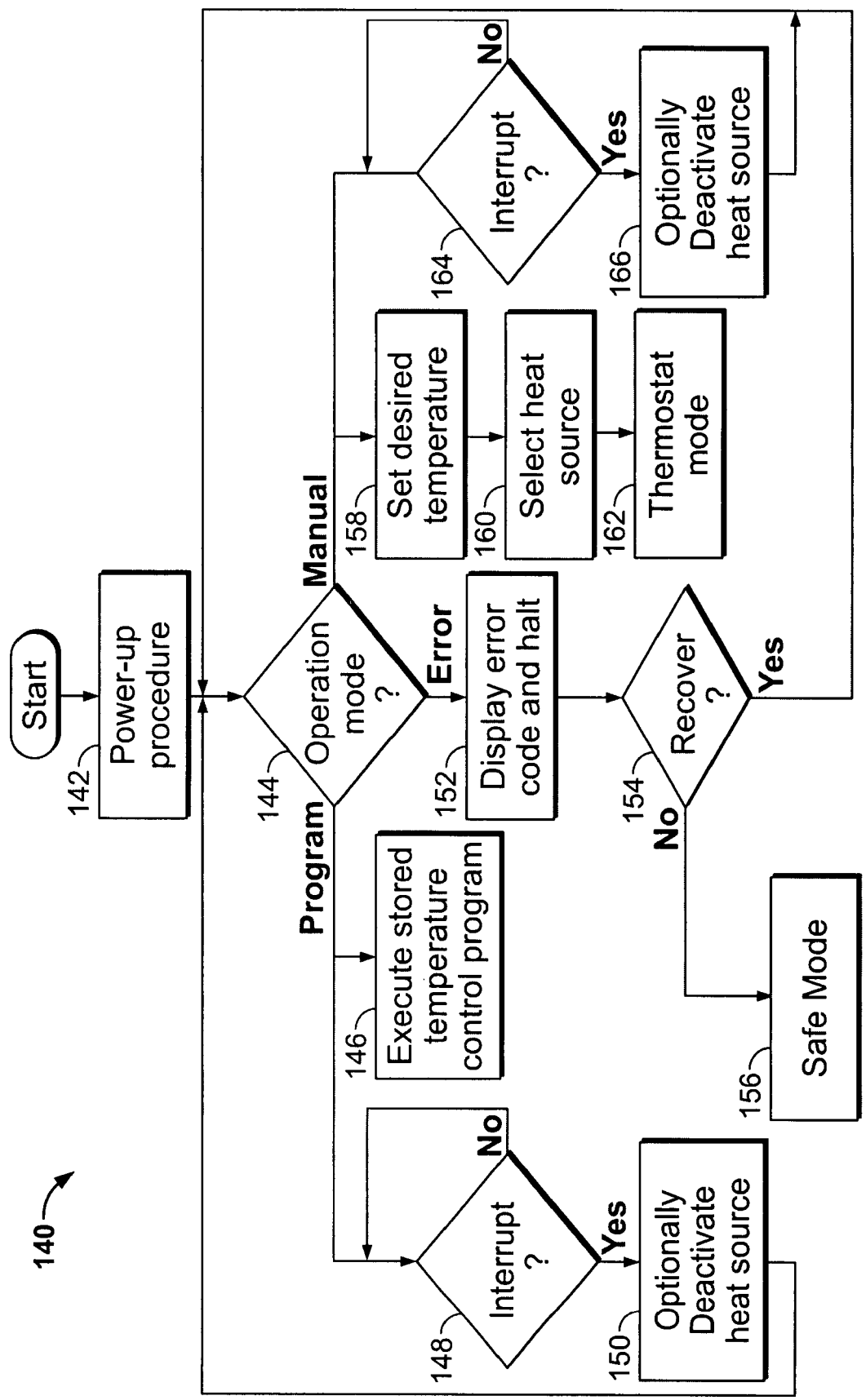
FIG. 5 is a flow chart showing processing steps of a stored temperature control program in accordance with the present invention.

With general reference to FIGS. 1, 2, and 5, and with particular reference to FIG. 5, a flow chart is provided showing processing steps of the stored temperature control program of the present invention, indicated generally at 140. The stored temperature control program 140 could be executed at step 124 of the main control program 100 of FIG. 4. The stored temperature control program 140 allows for both manual and program control of one or more heaters to heat pool or spa water to a desired temperature by a desired time. Upon the application of power to the controller 32 (see FIG. 1), the processor 54 loads the stored temperature control program 140 from the memory 56 and begins executing a power-up procedure at step 142. During the power-up procedure 142, which will be discussed in more detail hereinbelow with reference to FIG. 6, input parameters are entered by the user and sensor types and conditions are determined. After the power-up procedure 142 is completed, step 144 is invoked, wherein the processor 54 retrieves a flag from the memory 56 which indicates whether the controller 32 is to operate in manual mode or program mode, and whether an error condition is present. This flag is set either during the power-up procedure in step 142, or by the user when the user presses one of the keys on the keyboard 60 to select an operating mode, which may cause an interrupt to be generated. Of course, the controller 32 could be programmed to operate without generating interrupts. If, at step 144, the processor 54 determines that the controller 32 is to run in program mode, then at step 146, the processor 54 executes a stored temperature control sub-program which resides in the memory 56. This stored temperature control sub-program will be described hereinbelow with reference to FIG. 8. Operating in parallel is a process or task, illustrated in steps 148-150, which listens for interrupts (for example, from the keyboard 60). If the processor 54 receives an interrupt at step 148, then the processor 54 could, if necessary or desirable, deactivate any currently active heat sources (e.g., one of the heaters 28*a*-28*c* of FIG. 1) at step 150 and return to step 144.

If, at step 144, the processor 54 determines that an error condition has occurred, then at step 152, an error code is displayed to the user on the display 58. At step 154, the processor 54 attempts to recover from the error condition, and determines whether the error condition has been corrected. For example, the processor 54 could poll a device experiencing an error (either in a single poll or in a series of polls over a period of time) to ascertain whether the device has returned back to an operational state. If, at step 154, the processor 54 determines that the system is able to recover from the error condition, the processor 54 returns to step 144 for further processing. If, at step 154, the processor 54 determines that the system is not able to recover from the error condition, the processor 54 enters a safe mode at step 156 wherein any currently active heat source (e.g., one of the heaters 28a-28c of FIG. 1) is deactivated.

If, at step 144, the processor 54 determines that the controller 32 is to run in manual mode, then at step 158, the processor 54 prompts the user via the display 58 to enter a desired temperature to which to heat the pool. After the user enters the desired temperature at the keyboard 60, the desired temperature is stored by the processor 54 in the memory 56. Then, at step 160, the processor 54 prompts the user via the display 58 to enter a desired heat source. After the user enters the desired heat source at the keyboard 60, the desired heat source is stored by the processor 54 in the memory 56. At step 162, the processor 54 goes into thermostat mode, to be described hereinbelow with reference to FIG. 7. Operating in parallel is a process or task, illustrated in steps 164-166, which listens for interrupts (for example, from the keyboard 60). If the processor receives an interrupt at step 164, then the processor 54 could, if necessary or desirable, deactivate any currently active heat source (e.g., one of the heaters 28a-28c of FIG. 1) at step 166 and return to step 144.

Figure 6:
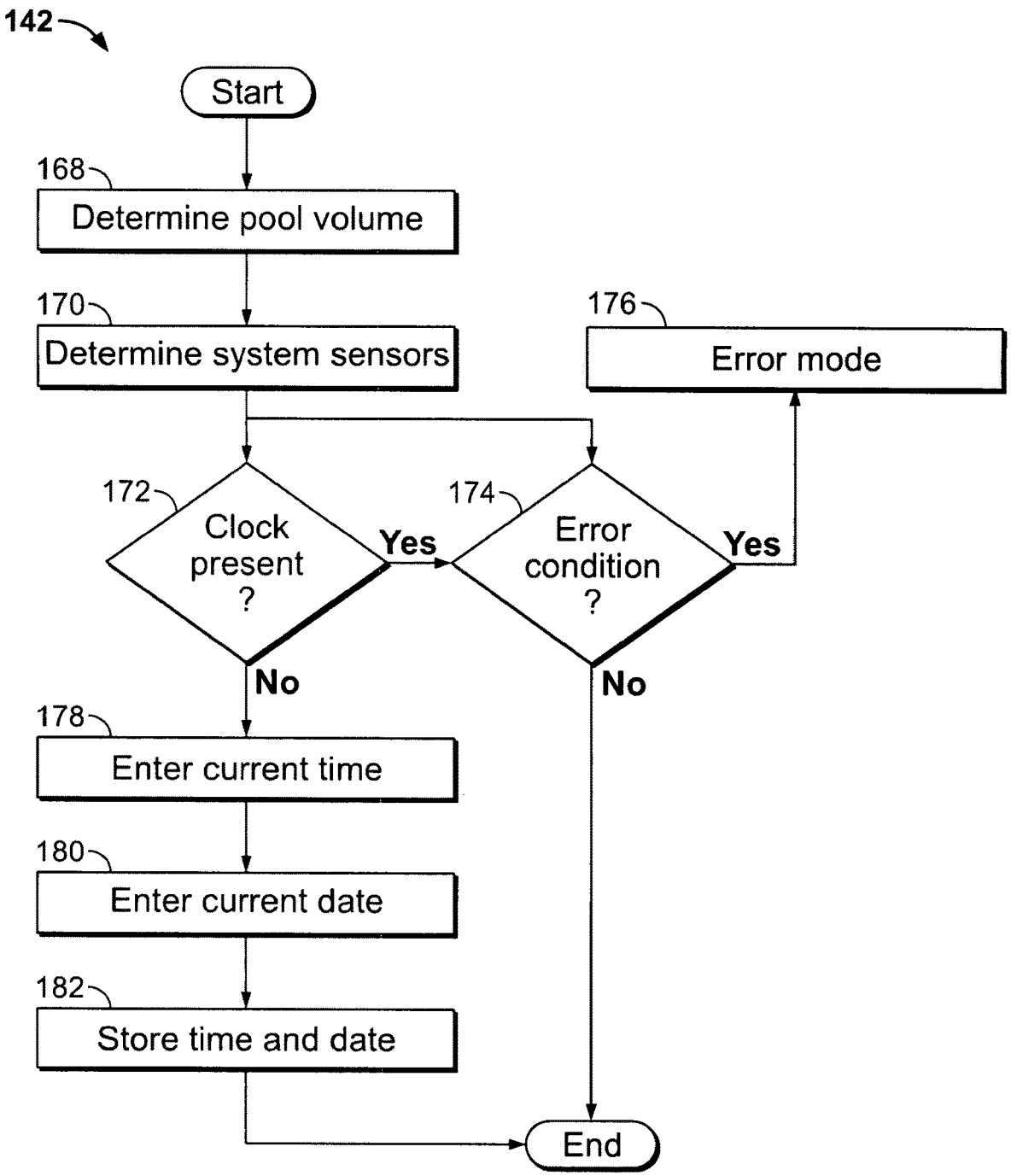
FIG. 6 is a flow chart showing, in greater detail, the thermostat mode carried out by the stored temperature control program of FIG. 5.

With reference to FIG. 6, which is a flow chart showing a power-up procedure 142 of FIG. 5 in greater detail, the total volume of water in the pool 12 is determined at step 168. The total volume of water can be determined automatically as described hereinbelow with reference to FIG. 9, or it can be entered by the user. At step 170, the processor 54 polls the sensor interface 70 via the multiplexer 68 and the I/O bus circuitry 62 to determine the numbers and the types of sensors present, and stores this information in the memory 56. At step 172, the processor 54 polls for the presence of a battery-backed clock (i.e., clock 52). If such a clock is determined to be present at step 172, then at step 174, the processor 54 determines whether the clock 52 is running properly. If not, then step 176 is invoked, wherein an error condition is flagged and the processor 54 then goes into error mode, and notifies the user of the error condition via the display 58. The processor 54 could also spawn a process or task to monitor proper functioning of the clock 52, which process or task could run in the background. If the clock 52 is running properly, then the current time and date are retrieved by the processor 54 from the clock 52, and this data is stored in the memory 56. If the processor 54 determines that a battery-backed clock (i.e., clock 52) is not present, then step 178 is invoked, wherein the processor 54 prompts the user at the display 58 to enter the current time. After the user has entered the current time at the keyboard 60, at step 180, the processor 54 prompts the user at the display 58 to enter the current date. After the user has entered the current date at the keyboard 60, then at step 182, the processor 54 stores the current time and date in the memory 56. It should be noted that the power-up procedure 142 could be substituted with one or more of the initialization procedures disclosed in connection with the main control program 100 of FIG. 4 without departing from the spirit of scope of the present invention.

Figure 7:
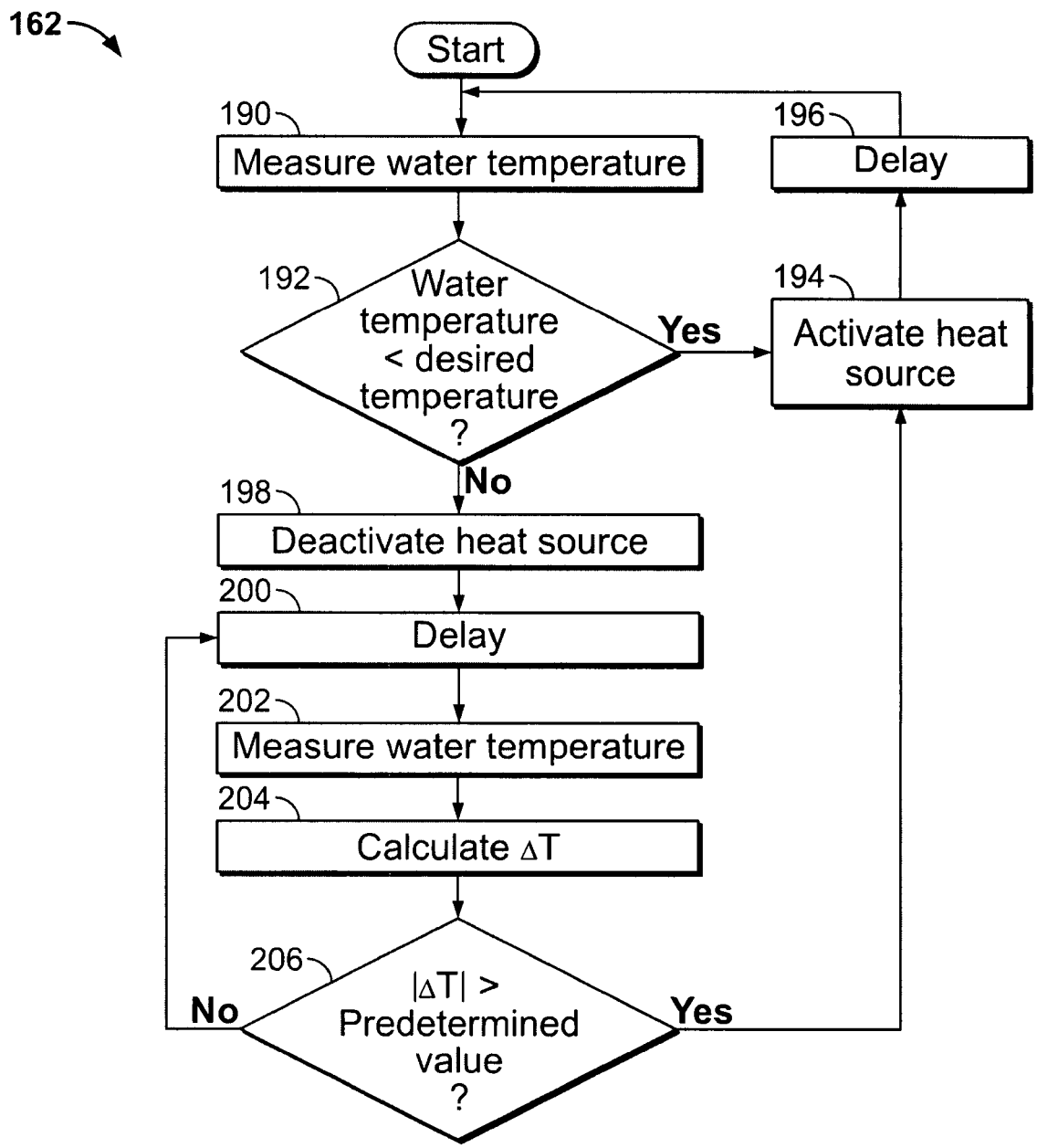
FIG. 7 is a flow chart showing, in greater detail, a stored temperature control sub-program executed by the control program of FIG. 5.

Referring to FIG. 7, which is a flow chart showing the thermostat mode 162 of FIG. 5 in greater detail, as well as to FIGS. 1 and 2, the processor 54 takes a measurement in step 190 of the temperature of the water 14 of the pool 12. At step 192, if the temperature of the water 14 is less than the desired temperature, then at step 194, the processor 54 activates a desired heat source (i.e., one of the heaters 28a-28c). Then, at step 196, the processor 54 delays a predetermined amount of time before returning to take another water temperature measurement at step 190. The delay could be pre-set by the manufacturer, or specified by the user.

If, at step 192, the processor 54 determines that the water temperature of the pool is equal to or greater than the desired temperature, then at step 198, the processor 54 deactivates the desired heat source. At step 200, the processor 54 delays a predetermined amount of time before taking a water temperature measurement at step 202. At step 204, the processor 54 then calculates the difference (ΔT) between the desired temperature and the present pool water temperature. At step 206, if the processor 54 determines that the absolute value of ΔT is greater than a predetermined value (i.e., a maximum permissible temperature deviation, which can be pre-set or specified by the user), then the processor 54, at step 194, reactivates the desired heating source. Otherwise, the program returns to step 200.

Referring again to FIG. 2, the processor 54 monitors pool temperature by selecting one or more of the output lines associated with the I/O bus circuitry 62 which, in turn, selects an address on address lines (not shown) of the multiplexer 68. The address corresponds to selecting the analog output voltage of the temperature sensors 38 or 40, both of which measure the water temperature of the pool. The analog output voltage of the sensor 38 or 40 is impressed upon the inputs of the A/D converter 66 via the multiplexer 68 and the sensor interface 70. The A/D converter 66 converts the voltage to a digital bit stream which travels through the I/O bus circuitry 62 to the processor 54. The processor 54 compares this temperature to the desired temperature stored in the memory 56. To activate a desired heat source, the processor 54 enables one of the valve actuators 30a-30c via one of the I/O lines of the I/O bus circuitry 62. This operates one of the valves 24a-24c which permits cool water 14 from the pool 12 to flow through the selected one of the heaters 28a-28c to provide hot water to the pool 12.

Figure 8:
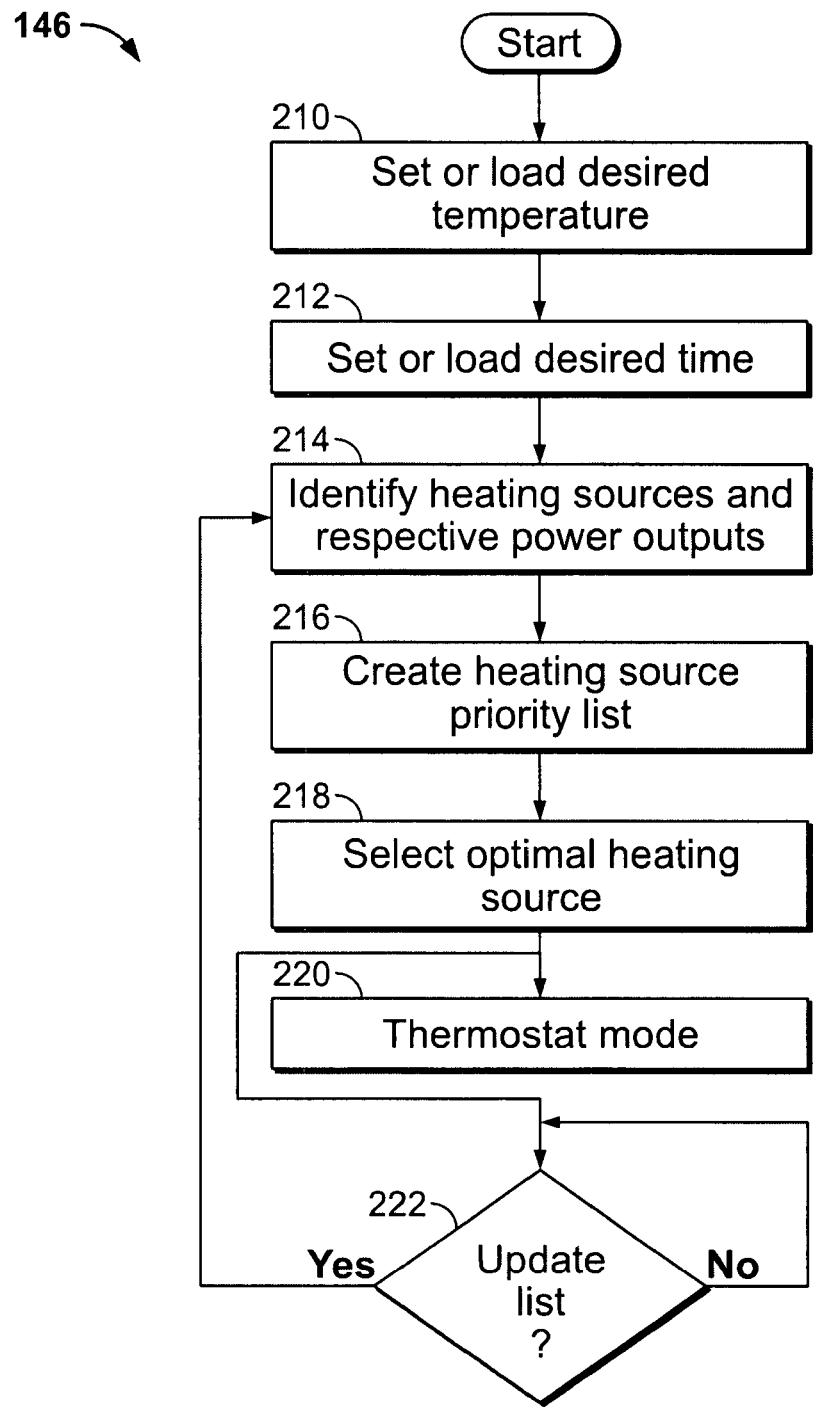
FIG. 8 is a flow chart showing a procedure for determining pool volume.

Referring to FIG. 8, which is a flow chart showing step 146 of FIG. 5 in greater detail, as well as to FIGS. 1 and 2, the desired temperature of water in the pool 12 is determined in step 210. If the user has previously entered the desired temperature, and no change in temperature is desired, then the processor 54 retrieves the desired temperature from the memory 56. If the user wishes to change the desired temperature, or the desired temperature has not been previously entered, then the processor 54 prompts the user at the display 58 for the desired temperature. After receiving the desired temperature from the user via the keyboard 60, the processor 54 stores the desired temperature in the memory 56. At step 212, the desired time at which the desired temperature is to be provided is determined. If the user has previously entered the desired time, and no change in time is desired, then the processor 54 retrieves the desired time from the memory 56. If the user wishes to change the desired time, or the desired time has not been previously entered, then the processor 54 prompts the user at the display 58 for the desired time. After receiving the desired time from the user via the keyboard 60, then the processor 58 stores the desired time in the memory 56.

At step 214, the processor 54 identifies the numbers and types of heat sources present (e.g., heaters 28a-28c), and determines the respective power outputs of each identified heat source. The processor 54 polls the heater interfaces 30a-30c via the I/O bus hardware 62, and then receives identification, model type, and power output from the heater interfaces 30a-30c over the I/O bus hardware 62. Alternatively, the processor 54 can determine the presence of each of the heater interfaces 30a-30c, and retrieve the model number and power output of each heat source from the memory 56. The data for each heater stored in the memory 56 can be preprogrammed at the factory, or it can be entered by the user during the power-up procedure 142 (see FIG. 5). For a solar array heating source, the processor 54 reads the current power output of the ambient light sensor 48, which is indicative of the power output of the entire solar array, and the processor 54 then makes a calculation of estimated power output of the solar array. At step 166, the processor 54 calculates the current pool water volume, to be described hereinafter with reference to FIG. 8. Based on current pool temperature, the ambient air temperature, the power output of each of the heating sources which are present, and, optionally, the water flow rate, the processor 54 generates in step 216 a heating source priority list, which will be described hereinbelow in greater detail with reference to FIG. 9. The heating source priority list can determine the most energy efficient and/or fastest heating source at the present time for heating the pool 12 up to the desired temperature by the desired time.

At step 218, the processor 54 selects the optimal heating source from the priority list generated at step 216. The processor 54 then enters thermostat mode at step 220 as previously described with reference to FIG. 7. In addition, at step 222, the processor 54 updates the heating source priority list. Since the parameters used to generate the heating source priority list, such as a change in power output of the ambient light sensor 48, may have changed, the processor 54 returns to step 164 to recalculate the heating source priority list.

Figure 9:
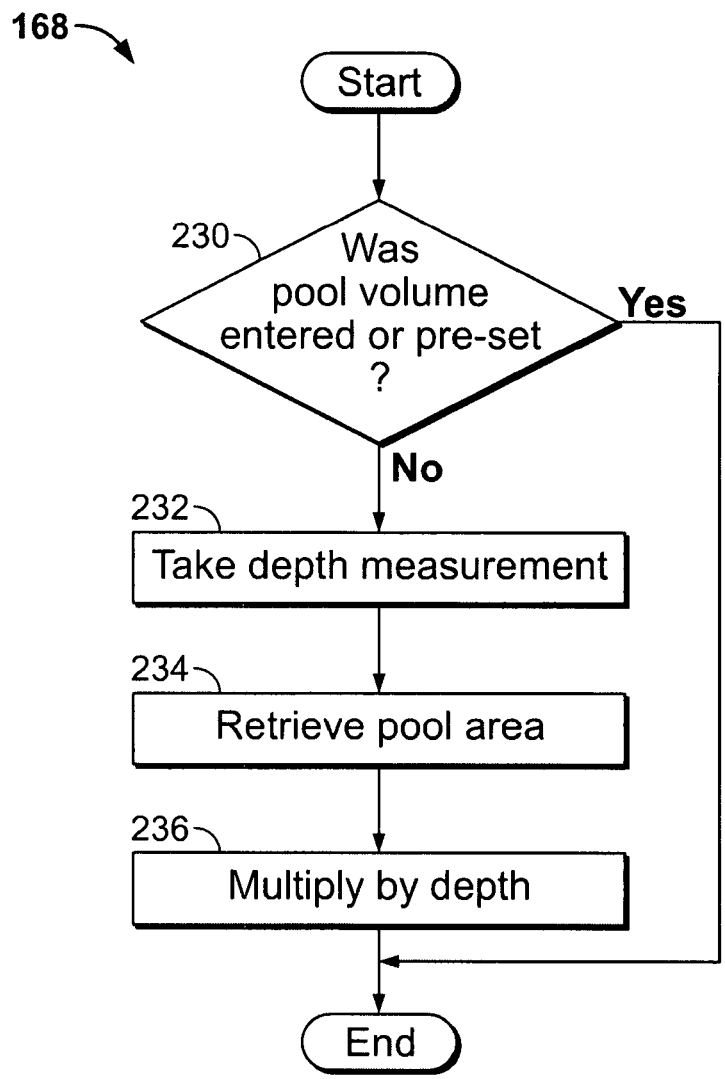
FIG. 9 is a flow chart showing a procedure for creating a heat source priority list.

With reference to FIG. 9, which is a flow chart showing step 168 of FIG. 6 in greater detail, if the pool volume was previously entered manually by the user during the start-up procedure 142 or preset in the memory 56, then this volume value is retrieved from the memory 56 in step 230 by the processor 54. If the pool volume is to be determined by current conditions, the processor 54 takes a depth measurement of the pool water 14 at step 232 by taking a reading of depth level sensor 36 via the sensor interface 70, the multiplexer 68, the A/D converter 66, and the I/O bus hardware 62. The processor 54 then recalls the pool area from the memory 56 at step 234. This pool area can be factory programmed, or entered by the user during the start-up procedure 142 (see FIG. 5). At step 236, the depth measurement determined at step 232 is multiplied by the pool area to obtain the current pool volume. It should be noted that other algorithms may be employed to calculate the current pool volume for pools that have irregular shapes. Moreover, the controller of the present invention could be programmed to include a volume of water corresponding to a pool or spa, or the user could be prompted to enter such information into the controller. Other attributes, such as the surface area of water in the pool or spa could be pre-programmed or entered by the user.

Figure 10:
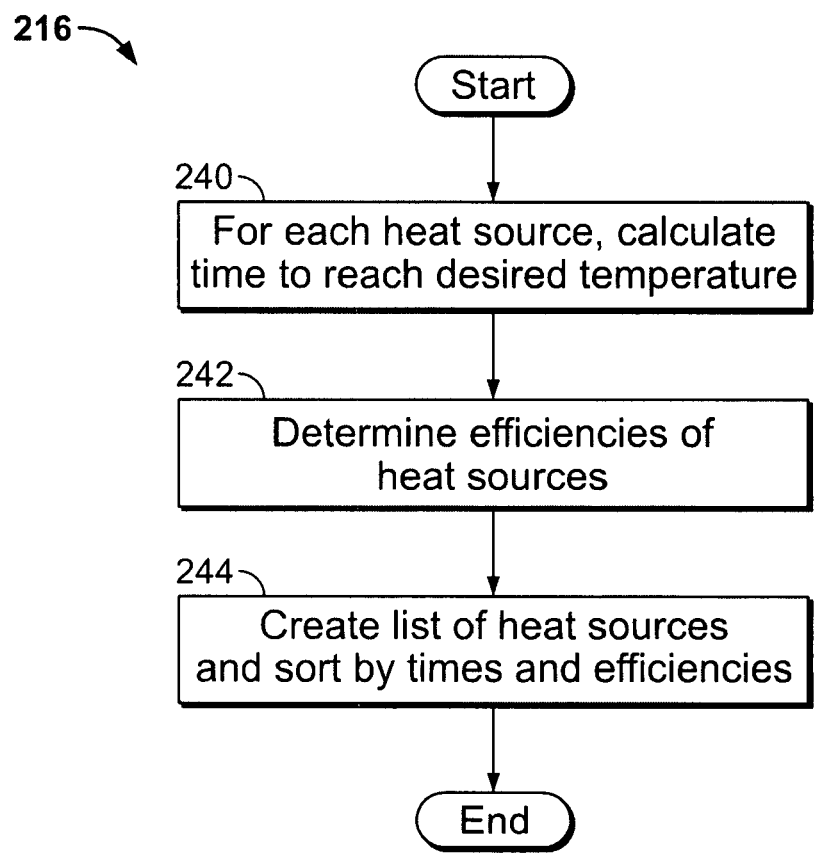
FIG. 10 is a flow chart showing step 216 of FIG. 8 in greater detail.

Referring FIG. 10, which is a flow chart showing step 216 of FIG. 8 in greater detail, as well as to FIGS. 1 and 2, the time it would take for each heat source present to heat the current volume of pool water to the desired temperature is calculated at step 240. At a minimum, the current pool temperature must be determined from a measurement from the temperature sensors 38 or 40. To obtain more accurate calculations, measurements from the other sensors 42 and 44-48, and, optionally, temperature sensors within the heater interfaces 30a-30c can be obtained by the processor 54.

The controller 32 of the present invention can calculate the approximate time it will take for each of the heaters 28a-28c to reach the desired temperature using known equations and stored information about each of the heaters 28a-28c connected to the controller, which could be preprogrammed by the manufacturer. For example, the controller 32 could prompt the user to specify the types of heating sources (i.e., heaters 28a-28c) that are present, and could then retrieve from memory power outputs (e.g., in BTU's) associated with the specified heating sources. Then, based upon the volume of the pool and the associated power outputs of the heating sources, the controller 32 can automatically calculate the time it will take each heating source to reach the desired temperature using known temperature calculations.

At step 242, based upon the estimated heating times, those sources which can heat the pool to the desired temperature by the desired time are determined and stored in the memory 56 along with the energy efficiency of each heat source. At step 244, these sources are arranged in a list in order of decreasing energy efficiency and/or increasing heating time. As discussed earlier with respect to FIG. 7, once the heating source priority list is generated, an optimal heating source is selected from the list and activated to heat the pool water. The optimal heating source is then monitored using the aforementioned thermostat mode. It should be noted that the controller 32 could be programmed to select a most optimal heating source, and if such heating source is not capable of achieving a desired temperature at a desired time, the controller 32 could activate one or more additional heating sources so that the desired temperature is provided at the desired time.

The present invention is subject to numerous variations and modifications. For example, the heaters 28a-28c and the valves 24a-24c can be arranged in a series configuration. To select a particular heating source, all but one of the valves 24a-24c is operated in bypass mode so that only the desired one of the heaters 28a-28c is not bypassed. In other embodiments, the multiple valves 24a-24c of FIG. 1, which are arranged in a parallel configuration, can be replaced by a single multi-way valve.

As another example, other criteria can be used to generate the priority list of step 216 of FIG. 8. Instead of ranking heaters 28a-28c based on energy efficiency, priority can be based on cost efficiency, e.g., according to the costs associated with running each heater for specified periods of time. Further, the heaters 28a-28c can be ranked in terms of speed (i.e., the minimum time it would take a given one of the heaters 28a-28c to heat the pool 12 to the desired temperature). The time to heat the pool can be determined with fewer sensors if estimates of parameters are used. For example, flow rate, hot water temperature, and pool volume can be replaced by factory programmed values, or parameters entered by the user during the power-up procedure 142 (see FIG. 5) which can be determined from the literature packaged with the equipment.

Additionally, the number of temperature sensors can be increased to improve the accuracy of determining the best representation of pool temperature. For instance, temperature sensors can be placed at several locations and depths in the pool 12 and the average temperature of all the temperature sensors can be taken as representing the temperature of the water 14 of the pool 12. Other types of sensors can be included for measuring quantities not directly related to determining a heating method, such as sensors which measure the pH of the water 12, and a pressure sensor for measuring the water pressure associated with the filter 22 to detect a reduction of fluid flow through the filter 22 due to sedimentation, etc.

The controller 32 could be programmed to determine if a brown-out condition (e.g., a decrease in the AC voltage level being supplied to the controller 32) occurs, as well as to prevent the pump 20 or an electric heat source from being used if such a condition is detected. The controller 32 could also include logic for controlling a variable speed pump 20 and automatically adjusting the speed of the pump 20 based on operating conditions. Further, the controller 32 could allow the user to input time ranges and corresponding costs for particular energy types, or periodically programmed (locally through software updates, or remotely through a data link connecting to the controller 32 to a utility company) with such information. For example, the controller 32 could allow the user to enter a first cost for electricity during peak hours (e.g. from 6:00 am to 10:00 pm) and a second cost for electricity during non-peak hours (e.g. from 10:00 pm to 6:00 am). Still further, the controller 32 could include a wireless or power line carrier (PLC) receiver for receiving signals representing energy costs which are transmitted by a local electric company. In such circumstances, the controller 32 could supplement active heat sources with an electric heat source during non-peak hours.

The controller 32 could also include a receiver for receiving power control commands from a utility company to adjust power consumption on demand. For example, the user may get a more favorable rate for electricity if the local electric company is permitted to periodically adjust electrical energy consumption. Moreover, the controller 32 could include an actuator for controlling an automatic pool covering device. For example, the controller 32 could be programmed to ensure that the pool is automatically covered at predetermined times or when the ambient temperature reaches a predetermined threshold to minimize heat loss due to evaporation. Still further, the controller 32 could be connected to an actuator for controlling a water feature in a pool or spa, such as a fountain or aerator, and programmed to control such devices at desired times.

Additionally, a single controller of the present invention could be programmed to control the temperatures of multiple bodies of water, and associated equipment (such as sensors and actuators, etc.) could be interconnected with the controller for operation with such multiple bodies of water. For example, a single controller could be implemented to control temperatures of both a pool and a spa. In such circumstances, the user can specify desired temperatures and desired times for achieving such temperatures for both the pool and the spa, and the system of the present invention will achieve such goals using one or more optimal heat sources. Moreover, the controller can selectively direct water flow from one or more heat sources to either (or both) of the pool and the spa, so as to achieve optimal heating for both bodies of water.

It should also be noted that the controller of the present invention could be programmed to allow a user to override (e.g., temporarily stop) an executing temperature control program, and then resume execution of such program. In such circumstances, the temperature control program could include the ability to re-assess environmental conditions (such as water temperature, ambient temperature, ambient humidity, etc.) and select an optimal heat source based on assessed conditions after execution of the control program has been resumed. Additionally, the controller could re-assess environmental conditions and select an optimal heat source based upon the remaining time to heat the pool water to the desired temperature at the desired time, after resumption of the temperature control program.

It will be understood that the embodiments described herein are merely exemplary and that a person skilled in the art may make many variations and modifications without departing from the spirit and scope of the invention. All such variations and modifications are intended to be included within the scope of the invention.

What is claimed is:

1. A temperature control system for a body of water, the body of water being at least one of a swimming pool and a spa, the control system comprising:
   a first heat source;
   a second heat source; and
   a programmable controller (a) receiving a value representative of a desired temperature of the water and (b) operable in a plurality of modes comprising:
      a first mode in which the first heat source is activated to raise a temperature of the water toward the desired temperature,
      a second mode in which the second heat source is activated to raise the temperature of the water toward the desired temperature,
      a third mode in which the first heat source is initially activated to raise the temperature of the water toward the desired temperature and the second heat source is subsequently activated if the first heat source is not capable of raising the temperature of the water to the desired temperature by a desired time, and
      a fourth mode in which a difference between the temperature of the water and the desired temperature is calculated, and the second heat source is activated if the difference is greater than a predetermined value.

2. The temperature control system of claim 1, comprising:
   a first flow valve for water flow to at least the first heat source; and
   a second flow valve for water flow to at least the second heat source,
   wherein the programmable controller controls the first valve and the second valve.

3. The temperature control system of claim 2, wherein the programmable controller controls at least the first valve and the second valve to optimize heat source selection.

4. The temperature control system of claim 2, where the first and second valves are in series.

5. The temperature control system of claim 2, where the first and second valves are in parallel.

6. The temperature control system of claim 1, wherein the first heat source comprises a heat pump.

7. The temperature control system of claim 6, wherein the second heat source comprises a gas heater.

8. The temperature control system of claim 1, comprising a temperature sensor for measuring an actual temperature of the water, and wherein raising the temperature of the water toward the desired temperature comprises raising the actual temperature of the water to at least as high as the desired temperature.

9. The temperature control system of claim 1, wherein the first heat source and the second heat source are two separate heating devices.

10. The temperature control system of claim 1, wherein the second heat source comprises a gas heater.

11. A temperature control system for a body of water, the body of water being at least one of a swimming pool and a spa, the control system comprising:
a first heat source;
a second heat source; and
a programmable controller (a) receiving a value representative of a desired temperature of the water and (b) operable in a plurality of modes comprising:
a first mode in which the first heat source is activated to raise a temperature of the water toward the desired temperature,
a second mode in which the second heat source is activated to raise the temperature of the water toward the desired temperature, and
a third mode in which the first heat source is initially activated to raise the temperature of the water toward the desired temperature and the second heat source is subsequently activated if the first heat source is not capable of raising the temperature of the water to the desired temperature by a desired time.

12. The temperature control system of claim 11, comprising:
a first flow valve for water flow to at least the first heat source; and
a second flow valve for water flow to at least the second heat source,
wherein the programmable controller controls the first valve and the second valve.

13. The temperature control system of claim 12, wherein the programmable controller controls at least the first valve and the second valve to optimize heat source selection.

14. The temperature control system of claim 12, where the first and second valves are in series.

15. The temperature control system of claim 12, where the first and second valves are in parallel.

16. The temperature control system of claim 11, wherein the first heat source comprises a heat pump.

17. The temperature control system of claim 16, wherein the second heat source comprises a gas heater.

18. The temperature control system of claim 11, comprising a temperature sensor for measuring an actual temperature of the water, and wherein raising the temperature of the water toward the desired temperature comprises raising the actual temperature of the water to at least as high as the desired temperature.

19. The temperature control system of claim 11, wherein the first heat source and the second heat source are two separate heating devices.

20. The temperature control system of claim 11, wherein the second heat source comprises a gas heater.

21. A temperature control system for a body of water, the body of water being at least one of a swimming pool and a spa, the control system comprising:
a first heat source;
a second heat source; and
a programmable controller (a) receiving a value representative of a desired temperature of the water and (b) operable in a plurality of modes comprising:
a first mode in which the first heat source is activated to raise a temperature of the water toward the desired temperature,
a second mode in which the second heat source is activated to raise the temperature of the water toward the desired temperature, and
a third mode in which a difference between the temperature of the water and the desired temperature is calculated, and the second heat source is activated if the difference is greater than a predetermined value.

22. The temperature control system of claim 21, comprising:
a first flow valve for water flow to at least the first heat source; and
a second flow valve for water flow to at least the second heat source,
wherein the programmable controller controls the first valve and the second valve.

23. The temperature control system of claim 22, wherein the programmable controller controls at least the first valve and the second valve to optimize heat source selection.

24. The temperature control system of claim 22, where the first and second valves are in series.

25. The temperature control system of claim 22, where the first and second valves are in parallel.

26. The temperature control system of claim 21, wherein the first heat source comprises a heat pump.

27. The temperature control system of claim 26, wherein the second heat source comprises a gas heater.

28. The temperature control system of claim 21, comprising a temperature sensor for measuring an actual temperature of the water, and wherein raising the temperature of the water toward the desired temperature comprises raising the actual temperature of the water to at least as high as the desired temperature.

29. The temperature control system of claim 21, wherein the first heat source and the second heat source are two separate heating devices.

30. The temperature control system of claim 21, wherein the second heat source comprises a gas heater.

* * * * *